United States Patent Office 3,506,470
Patented Apr. 14, 1970

3,506,470
PHOTOPRINTS COATED WITH POLYMERIC
ULTRAVIOLET LIGHT BARRIER COATINGS
Raymond H. Young, Jr., East Longmeadow, Saul M. Cohen, Springfield, Albert H. Markhart, Wilbraham, and Irving Serlin, Springfield, Mass., assignors to Monsanto Company, St. Louis, Mo., a corporation of Delaware
No Drawing. Original application July 8, 1965, Ser. No. 470,572, now Patent No. 3,444,129, dated May 13, 1969. Divided and this application Nov. 20, 1968, Ser. No. 777,508
Int. Cl. C08g 17/02; G03c 11/10
U.S. Cl. 117—33.3
12 Claims

ABSTRACT OF THE DISCLOSURE

Disclosed herein are photoprints which are coated with rearrangeable polyesters which are the polymeric reaction product of (1) an aromatic dihydric compound such as the ester derivatives of 4,4-bis(4'-hydroxyphenyl)pentanoic acid wherein there is at least one unsubstituted position ortho to the aromatic hydroxyl groups and (2) an aromatic dicarboxyl compound. The outer exposed surface of the polyester coating rearranges under the influence of ultraviolet light to afford excellent ultraviolet light protection to the coated photoprints.

CROSS-REFERENCES TO RELATED APPLICATIONS

This application is a division of copending application Ser. No. 470,572, filed July 8, 1965, now U.S. Patent No. 3,444,129.

BACKGROUND OF THE INVENTION

Field of the invention

The present invention relates to photoprints that are coated with aromatic polyesters capable of absorbing utraviolet light and acting as a barrier to ultraviolet light. More particularly the present invention relates to photoprints that are coated with solutions of aromatic polyesters, thin films of which are transparent and which will undergo rearrangement in the presence of ultraviolet light to form a transparent compound which is stable to and will act as a barrier to ultraviolet light. Photoprints thus coated will be protected from the harmful effects of ultraviolet light and retain their colors and clarity for longer than uncoated photoprints.

Description of the prior art

Ultraviolet light is that portion of the spectrum just beyond violet on the short wave length side, generally from 180 to 390 m$\mu$. Ultraviolet light is emitted by sunlight, carbon arc lamps, mercury vapor lamps, tungsten arc lamps and other light sources. The invisible rays from the ultraviolet region can induce chemical activity which is both beneficial and/or adverse. Some of the adverse effects of ultraviolet light are degradation of synthetic resins, such as polyvinyl chloride, used in exterior structures and articles exposed to sunlight, including rear windows used in convertible automobiles and the like; fading or discoloration of white or dyed synthetic and natural textiles; fading or deterioration of cellulosic materials such as wood, paper, and the like; tarnishing and discoloration of metals; fading of black and white and colored photographic prints; fading and discoloration of paints, etc. Indeed, the full list of adverse effects of ultraviolet light is too numerous to be set forth here.

Some aromatic polyesters currently available afford some partial degree of protection. These materials are inadequate by virtue of the fact that they either have undesirable color or they are not opaque to ultraviolet light, or more likely, they themselves are subject to ultraviolet light degradation.

Some polymeric products have shown properties which indicate that they would function as good ultraviolet barriers, however, the use of these products is not practical because of their poor solubility characteristics. They cannot be dissolved in solvents in sufficient quantity which would allow them to be coated onto photoprints. Likewise, they cannot be applied in a molten state or extruded onto photoprints because of their high melting point, etc.

SUMMARY OF THE INVENTION

The present invention is directed to photoprints coated with rearrangeable polyesters which are soluble in organic solvents at room temperature and which are the polymeric reaction products of an aromatic dihydric compound and an aromatic dibasic acid. The preferred dihydric compounds are the ester derivatives of 4,4-bis(4'-hydroxyphenyl)pentanoic acid wherein there is at least one unsubstituted position ortho to the aromatic hydroxyl group. Upon exposure to ultraviolet light the exposed outer surface of the polyester rearranges to form a coating of poly-(orthohydroxybenzophenone) units or analogs thereof which is capable of acting as a stable barrier to ultraviolet light thereby protecting the coated photoprint from the harmful effects of ultraviolet light.

The primary object of this invention is to provide coated photoprints which will be resistant to the adverse effects of ultraviolet light.

Another object of this invention is to provide a photoprint coated with two contiguous, superposed layers; one of which is formed by the rearrangement of the polyester layer and is capable of renewing or regenerating itself from the polyester layer.

Another object of this invention is the provision of a method of coating photoprints with aromatic polyesters which act as a barrier against ultraviolet light.

The foregoing and other objects are attained by coating the photoprints to be protected with a solution of a rearrangeable polyester having a molecular weight in the range of from 3,000 to 200,000 which comprises the polymeric reaction product of:

(A) From 10 to 100 parts, based on a total of 100 parts of (A) and (C), of an aromatic dihydric compound having at least one unsubstituted position ortho to an aromatic hydroxyl group wherein the aromatic dihydric compound corresponds to the general structural formula:

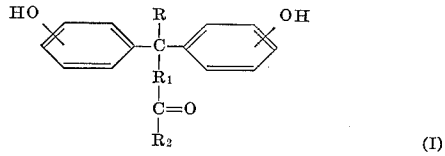

(I)

wherein R is selected from the group consisting of hydrogen and alkyl groups of from 1 to 6 carbon atoms, $R_1$ is an alkylene group of from 1 to 10 carbon atoms and $R_2$ is selected from the group consisting of amino, alkoxys of from 1 to 18 carbon atoms, —$OR_4$

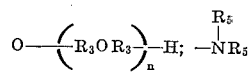

and —N=$R_6$, wherein each $R_3$ is an independently selected alkylene group of from 1 to 10 carbon atoms, $R_4$ is an aryl group of from 6 to 10 carbon atoms, each $R_5$ is independently selected from the group consisting of hydrogen, alkyls of from 1 to 6 carbon atoms and aryls of from 6 to 10 carbon atoms, $R_6$ is a divalent aliphatic radical of from 2 to 10 carbon atoms, and $n$ is an integer of from 1 to 8; and (B) At least one aromatic dicarboxyl compound capable of esterification, which is selected from the group consisting of aromatic dicarboxylic acids and acid halide derivatives thereof which are selected from the group consisting of unsubstituted and halo and alkyl substituted
(1) terephthalic acid, isophthalic acid, diphenic acid, binaphthyl dicarboxylic acid;
(2) the acid halides of the foregoing acids; and
(3) acids and acid chlorides which correspond to the general structural formula:

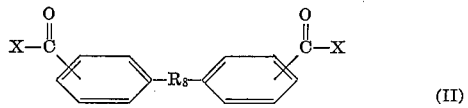
(II)

where X is selected from the group consisting of hydroxyl or halide and $R_8$ is selected from the group consisting of methylene, carbonyl, oxygen, sulfur, sulfone, isopropylidene, isobutylidene and ethylidene; and (C) From zero to 90 parts, based on a total of 100 parts of (A) and (C), of an aromatic dihydric compound selected from the group consisting of (1) an aromatic dihydric compound having at least one unsubstituted position ortho to an aromatic hydroxyl group, wherein the aromatic dihydric compound corresponds to the general formula:

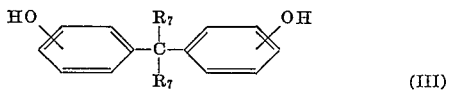
(III)

wherein each $R_7$ is independently selected from the group consisting of hydrogen and alkyl groups of from 1 to 8 carbon atoms; and
(2) a dihydric phenol, the total quantity of (A) and (C) being substantially stoichiometrically equivalent to the quantity of (B).

Examples of aromatic dihydric compounds corresponding to structural Formula I above are: 4,4-bis(4'-hydroxyphenyl)pentanoic acid; 5,5-bis(4'-hydroxyphenyl)pentanoic acid; 4,4 - bis(4' - hydroxyphenyl)hexanoic acid; 4,4-bis(4' - hydroxyphenyl)heptanoic acid; 4,4 - bis(4'-hydroxyphenyl)octanoic acid; 4,4-bis(4'-hydroxyphenyl)nonanoic acid; 4,4-bis(4'-hydroxyphenyl)decanoic acid; 5,5-bis(4'-hydroxyphenyl)hexanoic acid; 5,5-bis(4'-hydroxyphenyl)heptanoic acid; 5,5-bis(4'-hydroxyphenyl)nonanoic acid; 5,5-bis(4'-hydroxyphenyl)decanoic acid; 6,6-bis(4'-hydroxyphenyl)decanoic acid, etc.

Especially useful are the esters of the above mentioned acids such as the methyl, ethyl, propyl, butyl, amyl, hexyl, heptyl, octyl, nonyl, decyl, undecyl, dodecyl, tridecyl, tetradecyl, pentadecyl, hexadecyl, heptadecyl, octadecyl, esters of 4,4-bis(4'-hydroxyphenyl)pentanoic acid, 5,5-bis-(4'-hydroxyphenyl)pentanoic acid, etc.

Other esters include those which are the reaction product of the above mentioned acids and hydroxyl bearing compounds such as 2-ethoxyethanol, 2-butoxyethanol, 2-hexoxyethanol, diethylene glycol monobutyl ether, etc. It should be obvious to one skilled in the art that some of the ester derivatives may also contain ether type linkages in the aliphatic chain.

Other compounds which correspond to structural Formula I and which are useful in the practice of this invention include N,N-dimethyl-4,4-bis(4'-hydroxyphenyl)pentamide; N,N - diethyl-4,4-bis(4'-hydroxyphenyl)-pentanamide; N - methyl, N-propyl-4,4-bis(4'-hydroxyphenyl)pentanamide; N,N - dimethyl-4,4-bis(4'-hydroxyphenyl)decanamide; N,N - cyclohexyl-4,4-bis(4'-hydroxyphenyl)pentanamide; N,N - dicyclohexyl-4,4-bis(4'-hydroxyphenyl)hexanamide, etc.

Compounds corresponding to structural Formula I wherein $R_2$ is an aryl group would include phenyl-4,4-bis-(4' - hydroxyphenyl)pentanoate; tolyl - 4,4 - bis(4' - hydroxyphenyl)pentanoate; phenyl - 5,5 - bis(4' - hydroxyphenyl)decanoate, etc.

Especially preferred are the derivatives of 4,4-bis(4'-hydroxyphenyl)pentanoic acid such as the esters and amides which promote the solubility of the resultant polyester.

In combination with the aforementioned aromatic dihydric compounds one may use from zero to 90 parts, based on a total of 100 parts of total aromatic dihydric compound of a dihydric compound of the type represented by Formula III above.

Examples of the aromatic dihydric compounds represented by the general structural Formula III would include the bisphenols such as bisphenol-A or bisphenol-B or their derivatives. This group may include such compounds as 2,2-bis(4' - hydroxyphenyl)propane; 2,2-bis(4' - hydroxyphenyl)butane; 2,2 - bis(4'-hydroxyphenyl)-4-methylpentane; and methyl, ethyl, propyl, butyl, amyl and hexyl esters of 2,2-bis(4'-hydroxyphenyl)butyrate. The dihydric phenol portion may be represented by the following compounds: resorcinol, 2,4 - dihydroxyacetophenone, 2-methylhydroquinone, 5-methylresorcinol, 2-methylresorcinol, catechol, hydroquinone, 4-chlororesorcinol, 4-ethylresorcinol, 2-benzylresorcinol, 5-propylresorcinol, 2-hexylresorcinol.

The dihydric phenolic compound may also be a fused aromatic compound such as represented by dihydroxynaphthalene, dihydroxyanthracene, and dihydroxyanthraquinones. Compounds selected from these three groups must have at least one unsubstituted position ortho to at least one of the phenolic hydroxyl groups and said phenolic hydroxyls must be capable of bifunctional esterification to produce high polymers.

The aromatic dicarboxyl compound can be an aromatic dicarboxylic acid or an aromatic dicarboxylic acid halide or other ester-forming derivatives of the dicarboxylic acids, such as mixed anhydrides and esters of these acids, which are free of functional groups which would interfere with or compete with the bifunctional esterification reaction. These compounds are represented by the terephthalic acid and isophthalic acid, halophthalic acids such as chlorophthalic, chloroisophthalic, chloroterephthalic, bromophthalic, bromoisophthalic, bromoterephthalic, alkyl substituted phthalic acids such as methyl phthalic, ethylphthalic, tertiary butylisophthalic, 2,5-dimethylterephthalic acid, etc. Other examples would include tetrachloroterephthalic acid, diphenic acid, binaphthyl dicarboxylic acid and the acid chlorides and trifluoracetic mixed anhydrides and methyl and phenyl esters of all the foregoing.

Especially preferred are the acid chlorides because of their faster rates of reactions and availability.

Equally useful are acids or acid chlorides which correspond to the general structural formula:

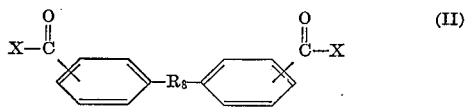
(II)

where X may be hydroxyl or halide and $R_8$ may be methylene, carbonyl, oxygen, sulfur, sulfone, isopropylidene, isobutylidene, ethylidene. Examples of compounds which correspond to this structure and which are useful in the practice of this invention include: oxydibenzoic acid, butylidene dibenzoic acid, thiodibenzoic acid, isopropylidene dibenzoic acid, ketodibenzoic acd, sulfodibenzoic acid, methylene dibenzoic acid, ethylidene dibenzoic acid.

The resultant polyester is dissolved in an organic liquid solvent, the polyester being present in an amount of 0.5% to about 75% by weight of the total weight of polyester and solvent. The organic solvent is selected from the groups consisting of aliphatic and aromatic halogenated hydrocarbons, aromatic and aliphatic ketones, aromatic hydrocarbons, disubstituted acetamides, aromatic esters, aliphatic and aromatic amines, aromatic ethers, aliphatic cyclic ethers, aromatic alcohols, aliphatic and alicyclic sulphoxides and sulphones, and unseparated alkyl aromatics. The polyester solution is applied to the substrate to be protected and the solvent is evaporated by any of the conventional means such as air drying, flashing the solvent off at high temperatures or drying in vacuum.

Upon exposure to ultraviolet light the exposed outer surface of the polyester rearranges to form a coating of poly(orthohydroxybenzophenone) units or analogs thereof, which is capable of acting as a stable barrier to ultraviolet light. Thus, it will be seen that to have this unique property of opacity to and stability to ultraviolet light the poly(ortho-hydroxybenzophenone) must be comprised of two aromatic rings with one ketone group between them and at least one hydroxyl group in a position ortho to the ketone.

Coatings of these polyesters only rearrange on a thin layer of the surface exposed to ultraviolet light, for as the rearranged structures are formed on exposure, they block any further transmission of ultraviolet light into the coating. It is therefore the unique property of these coatings to replenish the poly(ortho-hydroxybenzophenones) as these rearranged materials are gradually worn away by various conditions such as abrasion or ultimate chemical or physical degradation. In effect then, the coatings comprise a reservoir system wherein a surface exposed to ultraviolet light forms a continuous thin portion of rearranged polymer both stable to and opaque to ultraviolet light while the remaining polyester is available to regenerate or renew a rearranged portion when and if the protective portion is eroded or loses its efficiency.

It is to be noted that whereas the rearranged portion is usually the outer surface of the coating on most substrates, the rearranged material may be the inner or under surface of the coating if the coating is placed on the inner side of a substrate such as glass, transparent (to some degree) to ultraviolet light. The polyester portion of the coating in itself blocks ultraviolet light below 300 m$\mu$ while the rearranged portion extends this range to above about 400 m$\mu$. This screening effect may of course overlap somewhat, and, in the case of certain rearranged materials, may cut off light up to 450 m$\mu$.

It appears that even a monomolecular film of the rearranged polymer will afford protection of a substrate from ultraviolet light as this is substantially a surface phenomenon. The polyester portion of the coating may vary in thickness depending on the substrate to be protected as well as the method used in applying the polyester to the substrate.

The polyesters are preferably prepared according to one of the well known interfacial polymerization techniques such as the method set forth by W. M. Eareckson, III, in the "Journal of Polymer Science," vol. XL, pp. 399–406 (1959). It is thereby convenient to polymerize rapidly at low temperatures in order to obtain colorless, soluble products.

Another equally useful polymerization procedure is the low temperature solution polymerization as described by P. W. Morgan in "Polymer Preprints," vol. 5, No. 1, p. 225, American Chemical Society, Division of Polymer Chemistry, April 1964.

The following examples are given in illustration of the invention and are not intended as limitations thereof. All parts and percentages are by weight unless otherwise specified.

EXAMPLE 1

The polyester is prepared according to the following procedure:

Charge A
(1) 150 ml. water
(2) 15 ml. of 10% sodium lauryl sulfate solution in water
(3) 2.0 g. sodium hydroxide pellets
(4) 100 g. chopped ice
(5) 4 drops antifoam Charge B (6) 0.025 mole of a 1:1 molar mixture of isophthaloyl chloride and terephthaloyl chloride (I/T mixture)
(7) 0.025 mole of the 2 butoxyethyl ester of 4,4-bis(4'-hydroxyphenyl) pentanoic acid
(8) 75 ml. chloroform Charge A is placed in a Waring Blendor and the speed of the stirring regulated by a Powerstat. The solution is cooled to 3° C. by the addition of ice and the stirring increased to the maximum. Charge B is then added quickly in one portion. If the temperature of the polymerization rises to 7° C., additional ice is added. The emulsion is stirred for five minutes. Then the solid polymer is isolated either by pouring the emulsion into 1 liter of methanol or by adding methanol to the emulsion until coagulation occurs. The polymer is washed three or four times in the Waring Blendor with hot water, and finally it is collected on a Buchner funnel where it is washed with methanol. The polyester is then dried in a vacuum oven at 55° C./15 mm. for 15–20 hours. A white product is obtained in a 68% yield and a 0.5% solution in a 75:25 by volume mixture of phenol and tetrachlorethane has an inherent viscosity of about 0.63 at 30° C. Similar preparations in chloroform or methylene chloride also yield polymers having inherent viscosities of over 0.90 which are approximately equivalent to a molecular weight of about 40,000 to 50,000. The softening point of these latter polymers is about 80–95° C.

A 4% by weight solution in chloroform of one of these I/T polyesters of the 2-butoxyethanol ester of 4,4-bis-(4'-hydroxyphenyl)pentanoic acid having an inherent viscosity of 0.66 is prepared. This solution is cast on a portion of a color photoprint (Kodacolor) and allowed to dry at room temperature, forming a film with a thickness of 0.1 mil.

Similar color photoprints are partially coated with films ranging from 0.1 to 0.45 mil in thickness. The prints are then irradiated with a 450 watt Hanovia ultraviolet lamp at a distance of 25 cm. The unprotected portions of the prints fade rapidly, with the various blue dyes being the first to show signs of fading. The unprotected portion is bleached to a red-brown color after only 4½ hours. After 171 hours, that portion protected with the polyester coating with a thickness of 0.1 mil is just beginning to show fading of the blue component.

To compare the effectiveness of these polyphenyl esters with other polymers, a 1.5 mil film of poly(ethylene terephthalate) is placed over a portion of the color prints. Within 28 hours of exposure, as above, fading is noticed in the protected colors of the photoprints and the film itself becomes frosted and opaque.

Other comparisons are carried out using commercial acrylic resins containing 5%, by weight of resin, of standard monomeric ultraviolet absorbers. Film thicknesses of 2.0 mils on the photos show that fair protection of the colors is possible for some period. However, the acrylic films become badly cracked and blistered. When these acrylic coatings are coated onto color photoprints at a thickness of 0.3 mil, fading occurs under the protected portion as rapidly as it does on the unprotected portion of the photo.

EXAMPLE 2

This polyester is prepared according to the following procedure for solution polymerization.

Charge A (1) 2.14 g. butyl ester of 4,4-bis(4'-hydroxyphenyl) pentanoic acid
(2) 2.06 g. resorcinol
(3) 2.54 g. isophthaloyl chloride
(4) 2.54 g. terephthaloyl chloride
(5) 90 ml. methylene chloride

Charge B (6) 7.2 ml. triethylamine

Charge A is placed in a 250 ml. Erlenmeyer flask equipped with a water condenser and cooled to 10° C. Charge B is added slowly to the cooled A portion. The solution is agitated with a magnetic stirrer for 4 hours during which time the temperature of the reaction mixture is allowed to rise to 25–30° C.

The resultant polymer is isolated by precipitating the polymer solution into an excess of methanol. The resin is washed once with methanol, twice with water and dried in a vacuum oven for 15 hours at 70–80° C. The product yield is about 98% and the polymer has an inherent viscosity of 0.91 when run according to the procedure of Example 1.

A solution of the polymer in methylene chloride containing a small amount of cyclohexanone (0.158 part in one part) is used to form a 1 mil thick coating on a portion of coated paperboard coated with fluorescent dye paints. The coated paperboard is placed approximately 25 centimeters below a 450 watt Hanovia U.V. lamp. The unprotected portion of the fluorescing paints loses its fluorescence within 6 minutes while the fluorescence of the protected portions remains essentially unchanged even after 30 hours. The colors in the paints also fade on the unprotected portions while protection is greater than 90% for the coated portion.

Examples 3 to 22 illustrate the wide variety of aromatic dihydric compounds that one may use in the practice of this invention as well as the wide range of proportions of aromatic dihydric compounds to those dihydric compounds illustrated by Formula I. The aromatic dicarboxy portion was a 1:1 mixture of isophthalic and terephthalic acid chlorides and was kept essentially constant in these examples. The results are tabulated in Table I. All ratios for the dihydric compounds are given in moles. The inherent viscosities were run according to the procedure of Example 1 using a 0.5% solution in a 75:25 by volume mixture of phenol and tetrachloroethane at 30° C.

TABLE I.—EXAMPLES 3–22

| Example | Dihydric compound | Percent yield | Inh. visc. |
|---|---|---|---|
| 3 | Ethyl-4,4-bis(4'-Hydroxyphenyl)-pentanoate. | 92 | 0.77 |
| 4 | Butyl-4,4-bis(4'-hydroxyphenyl)-pentanoate. | 87 | 0.59 |
| 5 | Lauryl-4,4-bis(4'-hydroxyphenyl)-pentanoate. | 83 | 0.73 |
| 6 | N,N-pentamethylene-4,4-bis(4'-hydroxyphenyl)pentanamide. | 72 | 0.56 |
| 7 | 75/25 bisphenol-A/butyl-4,4-bis(4'-hydroxyphenyl)pentanoate. | 87 | 0.59 |

TABLE I.—EXAMPLES 3–22—Continued

| Example | Dihydric compound | Percent yield | Inh. visc. |
|---|---|---|---|
| 8 | 75/25 bisphenol-A/lauryl-4,4-bis(4'-hydroxyphenyl)pentanoate. | 69 | 0.69 |
| 9 | 75/25 2,2-bis(4'-hydroxyphenyl)-butane/butyl-4,4-bis(4'-hydroxyphenyl)pentanoate. | 94 | 0.83 |
| 10 | 75/25 2,2-bis(4'-hydroxyphenyl)-butane/lauryl-4,4-bis(4'-hydroxyphenyl)pentanoate. | 94 | 0.83 |
| 11 | 90/10 bisphenol-A/ethyl-4,4-bis(4'-hydroxyphenyl)pentanoate. | 95 | 0.95 |
| 12 | 75/25 bisphenol-A/ethyl-4,4-bis(4'-hydroxyphenyl)pentanoate. | 84 | 1.15 |
| 13 | 25/75 bisphenol-A/ethyl-4,4-bis(4'-hydroxyphenyl)pentanoate. | 98 | 1.73 |
| 14 | 25/75 bisphenol-A/2-butoxyethyl ester of 4,4-bis(4'-hydroxyphenyl)pentanoic acid. | 85 | 0.54 |
| 15 | 50/50 bisphenol-A/2-butoxyethyl ester of 4,4-bis(4'-hydroxyphenyl)pentanoic acid. | 74 | 0.64 |
| 16 | 50/50 bisphenol-A/4,4-bis 4'-hydroxyphenyl)pentanoic acid. | 80 | 0.21 |
| 17 | 98/2 bisphenol-A/4,4-bis(4'-hydroxyphenyl)pentanoic acid. | 90 | 0.16 |
| 18 | 91/9 bisphenol-A/4,4-bis(4'-hydroxyphenyl)pentanoic acid. | 89 | 0.15 |
| 19 | 85/15 bisphenol-A/butyl-4,4-bis(4'-hydroxyphenyl)pentanoate. | 73 | 1.09 |
| 20 | 25/75 resorcinol/butyl-4,4-bis(4'-hydroxyphenyl)pentanoate. | 95 | 0.90 |
| 21 | 90/10 resorcinol/butyl-4,4-bis(4'-hydroxyphenyl)pentanoate. | 93 | 0.85 |
| 22 | 75/25 2-methyl resorcinol/butyl-4,4-bis(4'-pydroxyphenyl)pentanoate. | 91 | 0.57 |

In Examples 3 to 22 the aromatic dihydric compounds which correspond to Formula I are varied from 2 parts (Example 18) to 100 parts (Examples 3–6) out of a possible total of 100 parts to illustrate the wide range in proportions that one might use in the practice of this invention.

Examples 7–19 illustrate the use of compounds which correspond to the general structure represented by Formula I in combination with (1) compounds represented by Formula II (Examples 7 to 19) and (2) dihydric phenols (Examples 20–22).

The inherent viscosities reflect the wide range of molecular weights that one might achieve in the practice of this invention. An inherent viscosity of 0.15 (cf. Example 18) corresponds to a molecular weight of about 2,000 while the value of 1.73 (cf. Example 13) would indicate a molecular weight of about 200,000.

Examples 23 to 34 are set forth in Table II to illustrate the wide range of dicarboxy compounds that one may use in the practice of this invention as well as the range in proportion of isophthalic to terephthalic acids. Ratios of reactants are given in terms of molar ratios.

TABLE II.—EXAMPLES 23 TO 34

| Example | Dihydric compound | Dicarboxyacid chloride | Percent yield | Inh. visc. |
|---|---|---|---|---|
| 23 | Ethyl-4,4-bis(4'hydroxyphenyl-pentanoate. | Terephthalic | 96 | 1.9 |
| 24 | Butyl-4,4-bis(4'-hydroxyphenyl) pentanoate. | Isophthalic | 99 | 1.5 |
| 25 | Ethyl-4,4-bis(4'-hydroxyphenyl)-pentanoate. | 1=1=1 isophthalic/terphthalic/oxy-dibenzoyl. | 87 | 0.6 |
| 26 | 75/25 resorcinol/butyl-4,4-bis(4'-hydroxyphenyl)pentanoate. | 2-methoxyethanol ester of trimellitic. | 34 | 0.12 |
| 27 | do | 1/1 isophtalic/terephthalic | 92 | 1.10 |
| 28 | Butyl-4,4-bis(4'-hydroxyphenyl)-pentanoate. | 60/40 tert. butyl isophthalic/terephthalic. | 91 | 0.6 |
| 29 | do | 1/1 isophthalic/methylterephthalic. | 93 | 0.7 |
| 30 | do | Oxydibenzoyl | 95 | 1.1 |
| 31 | do | 1/1 diphenic acid/isophthalic. | 82 | 0.5 |
| 32 | Ethyl-4,4-bis(4'-hydroxyphenyl) pentanoate. | Sulfodibenzoyl | 85 | 0.7 |
| 33 | do | Ketodibenzoyl | 98 | 0.2 |
| 34 | Ethyl-4,4-bis(4'-hydroxyphenyl)-pentanoate. | Isobutylidene | 95 | 0.9 |

Solutions of the polyester prepared in Example 1 above were used to coat Kodacolor prints and color transparency slides in order to study the degree of protection that these polymers afford against the degradation caused by ultraviolet light. The U.V. stability tests are conducted by placing the test specimens about 25 cm. away from a Hanovia 450 watt U.V. lamp and observing the degradation of the test specimen as a function of time.

In general, both the adhesion ability and the abrasion resistance of these coatings has been surprisingly satisfactory. It has been found especially advantageous to prepare copolymers of these polyesters using dihydric materials which correspond to Formula I alone or in combination with the compounds represented by Formula II and with dihydric phenol types and at least one di-acid. In this manner, it is possible to obtain polyesters combining

TABLE III.—RESULTS OF U.V. STABILITY TESTS

| Polyester example | Solvent | Substrate | Exposure time (hrs.) | Results on substrate | |
|---|---|---|---|---|---|
| | | | | Protected | Unprotected |
| 1 | Methylene chloride | Kodacolor prints | 7 | 90% color retention. | Colors faded. |
| 1 | Chloroform | Color transparency slides | 48 | do | Do. |

The polyester solutions may be applied by knife, spray, flow coater, curtain coater, dip or brush to give a full even coating. Free films may also be cast from solutions of these polyesters. These films can be conveniently laminated to photoprints using heat and pressure. A 0.5 mil thick film of rearranging polyester so laminated produced excellent protection from ultraviolet light.

EXAMPLE 35

The rearrangement of the polyester of poly(orthohydroxybenzophenones) was studied in the following manner.

A 0.50 mil film of the polyester of Example 1 is cast on glass from a 10% solution in toluene. The clear, transparent film is placed directly below a Hanovia 100-watt U.V. lamp and after various time increments, IR spectra of the film are obtained. These spectra are obtained both for the exposed side and for the unexposed side of the irradiated film by means of an attenuated total reflectance (ATR) attachment for a Beckman IR–5 spectrophotometer. Proof of the rearranged structure is obtained by measurement of the bands in the region $2.0\mu$ to $15\mu$.

The absorbance of the new benzophenone carbonyl peak formed at $6.12\mu$ by the irradiation is divided by the C–H absorbance at $3.35\mu$ using a standard baseline method to give a relative value for the amount of carbonyl present. The initial value of zero of this proportion, gradually grows to 0.15 on 15.5 hours of irradiation, to 0.40 after 70 hours and starts to level off at approximately 0.58 after about 175 hours. This levelling is believed due to the fact that the surface polymer molecules have rearranged to ultraviolet absorbing groups, thus prohibiting any further ultraviolet radiation from penetrating the film. No changes from the original polyester film are found on the unexposed side.

The U.V. lamp used for irradiation in this example is a Hanovia 100-watt high pressure quartz mercury-vapor lamp, model 608A. The lamp is 25 cm. above the film. The approximate intensity of the ultraviolet radiation at 336 m$\mu$ reaching the film is 100 microwatts/cm.$^2$. The total output of U.V. radiation from the lamp is 4.64 watts which represents 40.3% of the total radiation emitted, the remaining 59.7% consists of visible and infrared radiation.

The rearranged polyester is stable to ultraviolet radiation without undergoing apparent chain scission or crosslinking for at least 1,000 hours under the above conditions. Samples so exposed are found still soluble in chloroform and showed no appreciable change is viscosity. Additional proof of the rearranged structure is obtained by measuring the band intensities with an ultraviolet spectrophotometer.

When a film of poly(Bisphenol-A carbonate) is similarly irradiated for 800 hours, an IR spectrum shows no new bands in the region 5.8–6.2$\mu$. Obviously, all aromatic polyesters do not undergo this rearrangement, but rather they require a judicial selection of monomers and polymerization conditions. An aromatic polyester of 2,2-bis-(3′,5′-dichloro-4′-hydroxyphenyl)propane and isophthalic acid similarly fails to show evidence of rearrangement on irradiation.

desirable solubility of solution, with properties such as film clarity and film strength. The ester derivatives of Formula I are especially useful in enhancing the solubility of the polymers.

Certain polyesters which are not rearrangeable such as poly(Bisphenol-A carbonate) may give some protection at wave lengths below about 300 m$\mu$ because of their aromatic nature. However, they given no protection above about 300 m$\mu$ and do degrade at higher ultraviolet wave lengths. In addition, because of their inability to rearrange, they lack the ability to renew themselves. Polystyrene is known also to furnish some protection against U.V. light below about 300 m$\mu$. However, it is not stable to U.V. light about 300 m$\mu$ and so its protective action is short lived. In contrast thereto, poly(methyl methacrylate) doesn't protect substrates from U.V. light but is relatively stable thereto. The present polyesters are superior to a combination of the best ultraviolet properties of these two preceding materials.

Other nonrearrangeable polyesters have been formed using 2,2-bis(3′,5-dimethyl-4′-hydroxyphenyl)propane as the phenolic material with a mixture of isophthalic and terephthalic acids, as well as polyesters derived from substituted fumaric acid with Bisphenol-A. These do not contain an unsubstituted position ortho to the hydroxy group.

Certain monomeric materials may be usable but preferably only in small amounts because they may adversely affect the solubility of the products formed or inhibit the polymerization by limiting the products to low molecular weight. Such materials include ortho-phthalic acid and catechol or materials containing crosslinkable groups.

The polymerization of these polyesters is conducted with a non-reacting organic liquid which is a solvent for both the monomers used and the polymers produced in order to achieve the high molecular weights desired. When using interfacial condensation, the organic solvent must be capable of furnishing a two-phase system with the second liquid. Such solvents may be selected from those which are used as the solvents in the solution coating compositions containing these various polyesters. The solubility and solution stability will, of course, vary for each polymer with different solvents, and in some instances, mixtures of solvents are preferred. Some of the solvents used for coating compositions include aliphatic and aromatic halogenated hydrocarbons such as chloroform, methylene chloride, ethylene chloride, chlorobenzene; aromatic and aliphatic ketones such as methyl ethyl ketone, cyclohexanone and acetophenone; aromatic hydrocarbons such as benzene, toluene and xylene; di-substituted amides such as dimethyl acetamide; aromatic esters such as phenyl acetate; aliphatic amines such as N-methyl; aromatic amines such as pyridine; aromatic ethers such as dibenzyl ether, diphenyl ether; aliphatic cyclic ethers such as phenols; aliphatic and alicyclic sulphoxides and sulphones such as dimethyl sulfoxide, 1,1-dioxy-tetrahydrothiophene; and unsaturated alkyl aromatics such as styrene. Others include 2-ethoxyethyl acetate, 2-methoxyethyl acetate, 2-butoxyethoxyethanol, tetrahydrofuran, diacetone alcohol and N,N-dimethyl formamide.

The chlorinated hydrocarbons such as methylene chloride and chloroform are especially preferred both as polymerization solvents and as solvents for the coating compositions. Aromatic solvents such as toluene are also especially useful solvents for forming coating compositions from a variety of these polymers.

The coating compositions of this invention capable of forming clear films which are stable to and adsorb ultraviolet light comprise solutions of about 0.5% to about 75% of a polyaromatic polyester in a volatile organic solvent having a boiling point of about 40° C. to about 200° C. These aromatic polyesters having molecular weight of 3,000 to 200,000 are the polymeric reaction product of dihydric compounds having two phenolic hydroxyl groups with at least one unsubstituted position ortho to at least one of the phenolic hydroxyl groups with an aromatic reactive dicarboxy compound. The polymerization of these materials is by means of esterification.

A typical protective coating is of two contiguous superposed layers; (1) one layer being an aromatic polymer which is a rearranged polyester having stability as well as opacity toward ultraviolet light, said polymer having repeating units of a structural formula:

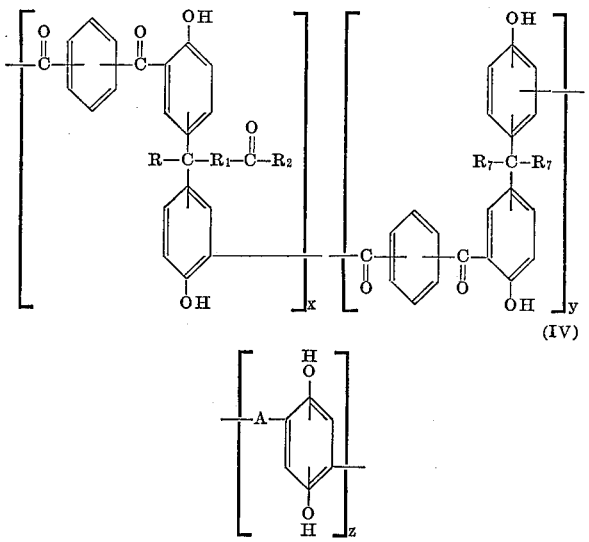

(IV)

These polymers are formed by rearrangement caused by ultraviolet light of another layer (2) of polyesters of a molecular weight of at least 3,000 having repeating units of a structural formula:

(V)

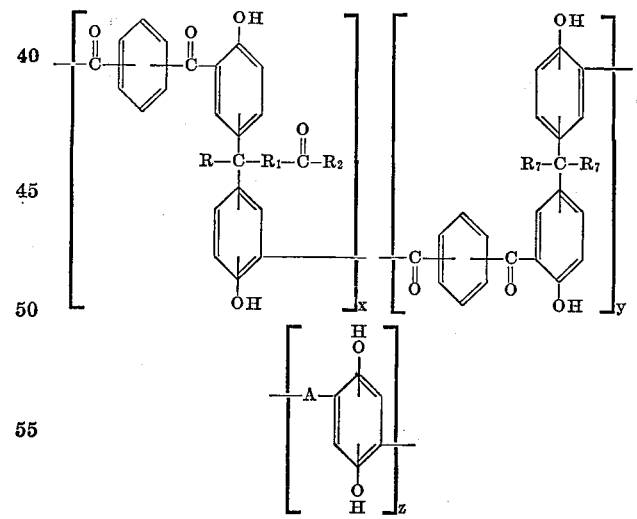

wherein R, $R_1$, $R_2$ and $R_7$ are as heretofore defined, A is the dicarboxylic acid moiety and $n$ is an integer of from 1 to 8, $x$ is an integer of from 5 to 70, $y$ is an integer of from 0 to 65 and $z$ is an integer of from 0 to 65, wherein the total of $y$ and $z$ is not greater than 65, and wherein polymer layer (1) is the layer exposed to the ultraviolet light and is the rearrangement product of the polyester (2).

The aromatic polyesters of this invention are soluble in organic solvents. Solutions of these aromatic polyesters form clear adherent continuous coatings, which on exposure to ultraviolet light rearrange on the exposed surface to form ultraviolet stable layers, which are also opaque to ultraviolet light. These rearranged layers must contain recurring units comprising 2 aromatic groups, such as phenol joined by the carbon of a carbonyl group, at least one of the aromatic groups having a hydroxyl group ortho to the carbonyl linkage. The remaining non-rearranged polyester resin is protected from the ultraviolet light by the rearranged layer. However, on weathering or other removal of the effects of the rearranged layer, the polyester functioning as a reservoir readily forms new rearranged layers on exposure to ultraviolet light.

This invention has been described above; however, it is not so limited. Variations and modifications such as pigments, dyes, fillers, resinous additives, stabilizers, may be added to the polyesters or solutions thereof without departing from the spirit or scope of this invention.

What is claimed is:

1. A photoprint protected from ultraviolet light with a clear adherent coating of two contiguous superposed layers: (1) an outer layer having a thickness of at least a monomolecular layer, said layer being an aromatic polymer having at least one hydroxyl group in an ortho position to at least one ketone group in each polymer unit, said polymer comprising repeating units of the structural formula:

and (2) an inner layer being a polyester having a molecular weight in the range of from 3,000 to 200,000 and at least one unsubstituted position ortho to at least one ester linkage in each polymer unit, said polyester having repeating units of the structural formula:

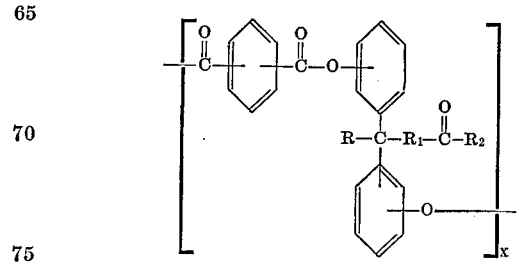

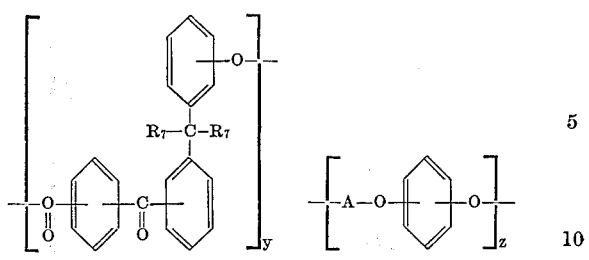

wherein R is selected from the group consisting of hydrogen and alkyl groups of from 1 to 6 carbon atoms, $R_1$ is an alkylene group of from 1 to 10 carbon atoms and $R_2$ is selected from the group consisting of amino, alkoxys of from 1 to 18 carbon atoms, and $-OR_4$.

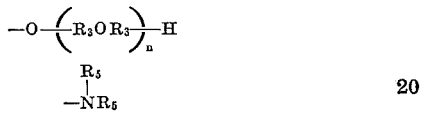

$-N=R_6$, wherein each $R_3$ is an independently selected alkylene group of from 1 to 10 carbon atoms, $R_4$ is an aryl group of from 6 to 10 carbon atoms, each $R_5$ is independently selected from the group consisting of hydrogen, alkyls of from 1 to 6 carbon atoms, and aryls of from 6 to 10 carbon atoms, $R_6$ is a divalent aliphatic radical of from 2 to 10 carbon atoms, $R_7$ is independently selected from the group consisting of hydrogen and alkyl groups of from 1 to 6 carbon atoms, A is a dicarboxylic acid moiety and $n$ is an integer of from 1 to 8, $x$ is an integer of from 5 to 70, $y$ is an integer of from 0 to 65 and $z$ is an integer of from 0 to 65, wherein the total of $y$ and $z$ is not greater than 65, and wherein polymer layer (1) is the layer exposed to the ultraviolet light and is the rearrangement product of the polyester (2).

2. A coated photoprint as in claim 1 wherein the polyester is the polymerization reaction product of
(a) a mixture of 25 to 75 mol percent of resorcinol and 75 to 25 mol percent of an alkyl ester of 4,4-bis(4'-hydroxyphenyl)pentanoic acid wherein the alkyl group contains from 1 to 18 carbon atoms; and
(b) a mixture of from 30 to 70 mol percent isophthalic acid and 70 to 30 mol percent terephthalic acid.

3. A coated photoprint as in claim 1 whrein the photoprint is a colored photoprint.

4. A coated photoprint as in claim 1 wherein the photoprint is a colored slide.

5. A coated photoprint as in claim 1 wherein the photoprint is a black and white photoprint.

6. A photoprint protected from the ultraviolet light with a clear adherent coating of two contiguous superposed layers comprising:
(I) an inner layer in contact with the photoprint, the inner layer being a rearrangeable polyester having a molecular weight in the range of from 3,000 to 200,000 which comprises the polymeric reaction product of:
(A) from 10 to 100 parts, based on a total of 100 parts of (A) and (C), of an aromatic dihydric compound having at least one unsubstituted position ortho to an aromatic hydroxyl group wherein the aromatic dihydric compound corresponds to the general structural formula:

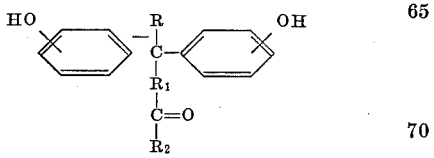

wherein R is selected from the group consisting of hydrogen and alkyl groups of from 1 to 6 carbon atoms, $R_1$ is an alkylene group of from 1 to 10 carbon atoms and $R_2$ is selected from the group consisting of alkoxys of from 1 to 18 carbon atoms, and $-O(R_3OR_3)_nH$, wherein each $R_3$ is an independently selected alkylene group of from 1 to 10 carbon atoms and $n$ is an integer of from 1 to 8,
(B) at least one aromatic dicarboxyl compound capable of esterification, which is selected from the group consisting of aromatic dicarboxylic acids and acid halide derivatives thereof which are selected from the group consisting of unsubstituted and halo and alkyl substituted
(1) terephthalic acid, isophthalic acid, diphenic acid, binaphthyl dicarboxylic acid;
(2) the acid halides of the foregoing acids; and
(3) acids and acid chlorides which correspond to the general structural formula:

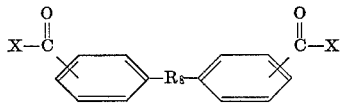

wherein X is selected from the group consisting of hydroxyl or halide and $R_8$ is selected from the group consisting of methylene, carbonyl, oxygen, sulfur, sulfone, isopropylidene, isobutylidene and ethylidene; and
(C) from zero to 90 parts, based on a total of 100 parts of (A) and (C), of an aromatic dihydric compound selected from the group consisting of
(1) an aromatic dihydric compound having at least one unsubstituted position ortho to an aromatic hydroxyl group, wherein the aromatic dihydric compound corresponds to the general formula:

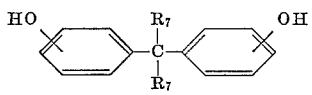

wherein each $R_7$ is independently selected from the group consisting of hydrogen and alkyl groups of from 1 to 8 carbon atoms; and
(2) a dihydric phenol,
the total quantity of (A) and (C) being substantially stoichiometrically equivalent to the quantity of (B); and
(II) an outer exposed layer in contiguous superposed relationship to the inner polyester layer, said outer layer having a thickness of at least a monomolecular layer which outer layer is the ultraviolet light rearranged product of the inner polyester layer.

7. A coated photoprint as in claim 6 wherein the photoprint is a colored photoprint.

8. A coated photoprint as in claim 6 wherein the photoprint is a colored slide.

9. A coated photoprint as in claim 6 wherein the photoprint is a black and white photoprint.

10. A photoprint protected from ultraviolet light with a clear adherent coating of two contiguous superposed layers comprising:
(1) an inner layer in contact with the photoprint, the inner layer being a rearrangeable polyester having a molecular weight in the range of from 3,000 to 200,000 which is the polymeric reaction product of
(A) from 10 to 100 parts based on a total of 100 parts of (A) and (C) of an alkyl ester of 4,4-bis-(4'-hydroxyphenyl)pentanoic acid wherein the alkyl group contains from 1 to 18 carbon atoms;
(B) a mixture of isophthalic acid and terephthalic acid; and (C) from zero to 90 parts based on a total of 100 parts of (A) and (C) of resorcinol, the total quantity of (A) and (C) being substantially stoichiometrically equivalent to the total quantity of (B); and (2) an outer layer which is the ultraviolet rearranged product of the inner polyester layer.

11. A photoprint protected from ultraviolet light with a clear adherent coating of two contiguous superposed layers: (1) an outer layer having a thickness of at least a monomolecular layer, said layer being an aromatic polymer having at least one hydroxyl group in an ortho position to at least one ketone group in each polymer unit, said polymer comprising repeating units of the structural formula:

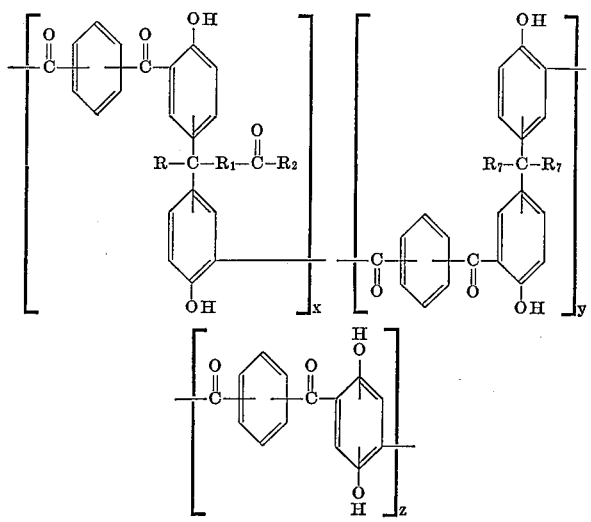

and (2) an inner layer which is a polyester having a molecular weight in the range of from 3,000 to 200,000 and at least one unsubstituted position ortho to at least one ester linkage in each polymer unit, said polyester having repeating units of the structural formula:

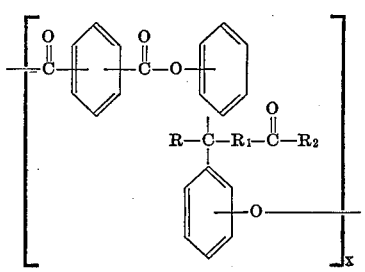

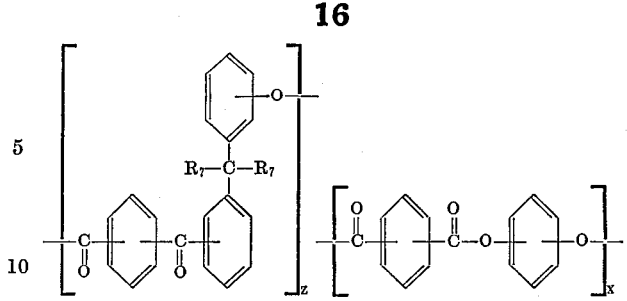

wherein R is selected from the group consisting of hydrogen and alkyl groups of from 1 to 6 carbon atoms; $R_1$ is an alkylene group of from 1 to 10 carbon atoms; $R_2$ is selected from the group consisting of amino, alkoxys of from 1 to 18 carbon atoms; $-O(R_3OR_3)_nH$, and

wherein each $R_3$ is an independently selected alkylene group of from 1 to 10 carbon atoms and each $R_5$ is independently selected from the group consisting of hydrogen and alkyls of from 1 to 6 carbon atoms; $R_7$ is independently selected from the group consisting of hydrogen and alkyl groups of from 1 to 6 carbon atoms; and $n$ is an integer of from 1 to 8; $x$ is an integer of from 5 to 70; $y$ is an integer of from 0 to 65; and $z$ is an integer of from 0 to 65; wherein the total of $y$ and $z$ is not greater than 65, and wherein polymer layer (1) is the layer exposed to the ultraviolet light and is the rearrangement product of the polyester (2).

12. A coated photoprint as in claim 11 wherein $R_2$ is $-O(R_3-O-R_3)_nH$, wherein each $R_3$ is an independently selected alkylene group of from 1 to 10 carbon atoms and $n$ is an integer of from 1 to 8.

References Cited

UNITED STATES PATENTS

| | | |
|---|---|---|
| 2,907,736 | 10/1959 | Greenlee. |
| 2,933,520 | 4/1960 | Bader. |
| 3,160,602 | 12/1964 | Kantor et al. |
| 3,309,334 | 3/1967 | Holub. |
| 3,322,555 | 5/1967 | Himmelmann et al. 117—45 X |
| 3,365,295 | 1/1968 | Nittel et al. 117—33.3 X |
| 3,415,670 | 12/1968 | McDonald 117—33.3 X |

MURRAY KATZ, Primary Examiner

R. HUSACK, Assistant Examiner

U.S. Cl. X.R.

96—84; 117—45, 76, 93.31, 138.8, 143, 161; 252—300; 260—47

PO-1050
(5/69)

UNITED STATES PATENT OFFICE
CERTIFICATE OF CORRECTION

Patent No. 3,506,470          Dated April 14, 1970

Inventor(s) Raymond H. Young, Jr., Saul M. Cohen, Albert H. Markhart, & Irving Serlin It is certified that error appears in the above-identified patent and that said Letters Patent are hereby corrected as shown below:

Column 8, Table 2, Example 25, "1=1=1" should read --- 1:1:1 ---.

Column 11, line 6, "adsorb" should read --- absorb ---.

Claim 11, Column 16, line 11, the subscript outside the bracket in the fifth formula should be changed from "z" to --- y ---.

Claim 11, Column 16, line 11, the subscript outside the bracket in the sixth formula should be changed from "x" to --- z ---.

SIGNED AND
SEALED
AUG 25 1970

(SEAL)
Attest:

Edward M. Fletcher, Jr.
Attesting Officer

WILLIAM E. SCHUYLER, JR.
Commissioner of Patents